United States Patent
Milligan

(10) Patent No.: US 6,400,522 B1
(45) Date of Patent: Jun. 4, 2002

(54) VISCOSITY COMPENSATION BY SPINDLE MOTOR PRE-HEATING

(75) Inventor: Gene Emmett Milligan, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/119,421

(22) Filed: Jul. 20, 1998

Related U.S. Application Data
(60) Provisional application No. 60/067,799, filed on Dec. 3, 1997.

(51) Int. Cl.[7] .......................... G11B 15/18; G11B 19/02
(52) U.S. Cl. .......................................... 360/69; 360/71
(58) Field of Search .......................... 360/69, 55, 97.01, 360/137, 98.07, 99.04, 99.08, 71; 384/100, 99, 107, 115; 369/53, 53.3, 269

(56) References Cited

U.S. PATENT DOCUMENTS

| | | | |
|---|---|---|---|
| 4,876,491 A | 10/1989 | Squires et al. | 318/138 |
| 5,112,142 A | * 5/1992 | Titcomb et al. | 384/107 |
| 5,487,608 A | 1/1996 | Leuthold et al. | 384/113 |

FOREIGN PATENT DOCUMENTS

JP 6-150527 * 5/1994

* cited by examiner

Primary Examiner—Andrew L. Sniezek
(74) Attorney, Agent, or Firm—Schwegman, Lundberg, Woessner & Kluth, P.A.

(57) ABSTRACT

A disk drive system includes a base, a disk stack rotatably attached to the base, and an actuator assembly movably attached to the base. The disk stack is rotatably attached to the housing or the base using a hydrodynamic bearing. The disks are actually mounted or attached to a hub. An electric motor is formed inside the hub. Current is passed through the windings of an electric motor to rotate the hub. The windings are located near the bearing surface of the hydrodynamic bearings. Before applying a current which will start the rotation of the hub, a current is passed through the windings or coil of the electric motor to heat the lubricating fluid used as part of the hydrodynamic bearing. By heating the lubricating fluid, the start torque required to begin the rotation of the hub according to the start profile is reduced. The length of time for application of current at a level which heats the bearing surface and the lubricating fluid at the bearing surface may be controlled by a feedback control loop or may merely be a selected time which does not vary from disk drive to disk drive. Various indicators of the viscosity of the lubricant can be used to monitor the viscosity, if a feedback control loop is used. An adaptive program can also be used based on parameters such as temperature, sensing of winding current, and voltage. The current applied before startup can be alternating current or direct current.

14 Claims, 5 Drawing Sheets

VISCOSITY COMPENSATION BY SPINDLE MOTOR PRE-HEATING

RELATED APPLICATION

This application claims the benefit of U.S. Provisional Application Ser. No. 60/067799, filed Dec. 3, 1997 under 35 USC119(e).

FIELD OF THE INVENTION

The present invention relates to the field of mass storage devices. More particularly, this invention relates to a disk drive which includes a spindle motor with a hydraulic bearing in the spindle.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a recording/playback transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high revolutions per minute ("RPM"). These days common rotational speeds are 7200 RPM. Some rotational speeds are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disk. The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 1 to 2 micro inches. In some disk drives, the ceramic block does not fly on a cushion of air but rather passes along a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the designated transducer is accurately positioned over the designated track on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information. It should be noted that the tracks on a disk drive are very thin and closely spaced. Currently, track densities are as high as 15,000 tracks per inch. In practical terms, this means that there are as many as 12 tracks across the width of a single human hair. Of course, track densities will increase in the future.

In the past, the spindle or hub was mounted to the stationary portion of the housing of the disk drive using a race and bearing set. In other words, ball bearings within a race were used to provide an adequately smooth connection between the rotating portion (the hub or spindle) and the stationary portion (fixed shaft) of the disk drive. This is adequate in disk drives that rotated at 3600 rpm or 5200 rpm. Rotational speeds of the disks in a disk drive were then driven to the 7200 rpm level. One reason for higher rpm levels is the constant push by manufacturer's to minimize access times to data stored on the disk. When the disk pack is rotated at a higher rpm, the access times are less.

It is a well-known fact that as the rotational speeds of a mechanical component increases. The life of the components decreases due to increased mechanical wear. At the 7200 rpm level, manufacturers were seeking different ball bearing materials to extend the life beyond the life associated with metal ball bearings.

Manufacturers are also constantly increasing the capacity of disk drives. One method is to increase the track density. Track density is the number of tracks in an inch. Currently, disk drives have track densities as high as 15,000 tracks per inch. Of course, to increase capacity of disk drives, this parameter will have to be increased. The tracks are very closely spaced. When the tracks are so closely spaced, runout becomes a problem. Runout comprises repeatable runout and non-repeatable runout. Non-repeatable runout is non-repeatable radial motion of the tracks or heads and arises because of mechanical vibrations in the actuator, disk, and spindle assembly. One of the significant contributors to non-repeatable runout is due to spindle bearings. The outer race of a bearing set rotates faster than the inner race of a bearing set. If the inner race of the bearing set is deformed slightly during assembly, or due to some other reason, forces are produced as the outer race travels around the inner race. The forces actually give rise to irregular mechanical vibrations. The non-repeatable runout becomes more of a problem as the track density increases. Another way to state this is that the non-repeatable runout becomes more of a problem as the spacing between the tracks gets smaller. In other words, when the spacing between the tracks becomes sufficiently small, even a small amount on non-repeatable runout makes keeping on track difficult.

To lessen non-repeatable runout, the bearing and race set used in the spindle assembly of disk drives has been replaced by a hydraulic bearing. A hydraulic bearing is also referred to as a hydrodynamic bearing. Spindle assemblies that use hydraulic bearings offer several advantages. One of the main advantages is more accurate disk rotation with less vibration. The end result, is quieter operation with less non-repeatable runout.

Hydraulic bearings do have a problem. The bearing surfaces are large and a lubricant is used to coat the bearing surfaces. The viscosity of the lubricant is lower when the lubricant is at the operating temperature of the disk drive. The viscosity is higher when the lubricant is at a temperature less than the operating temperature of the disk drive, such as at startup of the disk drive. At startup, a high applied torque needs to be applied as a result of the high viscosity of the lubricant at the lower temperature. This leads to designing a spindle motor that has a large starting torque since a large starting torque is needed to start the rotation of the spindle. Generally, a motor which has a high start torque is less efficient when running at the operating temperature. It would be advantageous if a method and apparatus could be used to reduce the viscosity of the hydraulic bearing during the startup time of the motor. Then the spindle motor would require less startup torque and would be more efficient when it ran at operating temperature.

SUMMARY OF THE INVENTION

A disk drive system includes a base, a disk stack rotatably attached to the base, and an actuator assembly movably attached to the base. The disk stack is rotatably attached to the housing or the base using a hydrodynamic bearing. The disks are actually mounted or attached to a hub. An electric motor is formed inside the hub. Current is passed through the windings of an electric motor to rotate the hub. The windings are located near the bearing surface of the hydrodynamic bearings. Before applying a current which will start the rotation of the hub, a current is passed through the windings or coil of the electric motor to heat the lubricating fluid used as part of the hydrodynamic bearing. By heating the lubricating fluid, the start torque required to begin the rotation of the hub according to the start profile is reduced. The length of time for application of current at a level which heats the bearing surface and the lubricating fluid at the bearing surface may be controlled by a feedback control loop or may merely be a selected time which does not vary from disk drive to disk drive. Various indicators of the viscosity of the lubricant can be used to monitor the viscosity, if a feedback control loop is used. An adaptive program can also be used based on parameters such as temperature, sensing of winding current, and voltage.

Advantageously, such a system allows disk drives to use electric motors which have lower start torques. These motors are typically more efficient in the run mode when the disk pack is spinning during operation.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
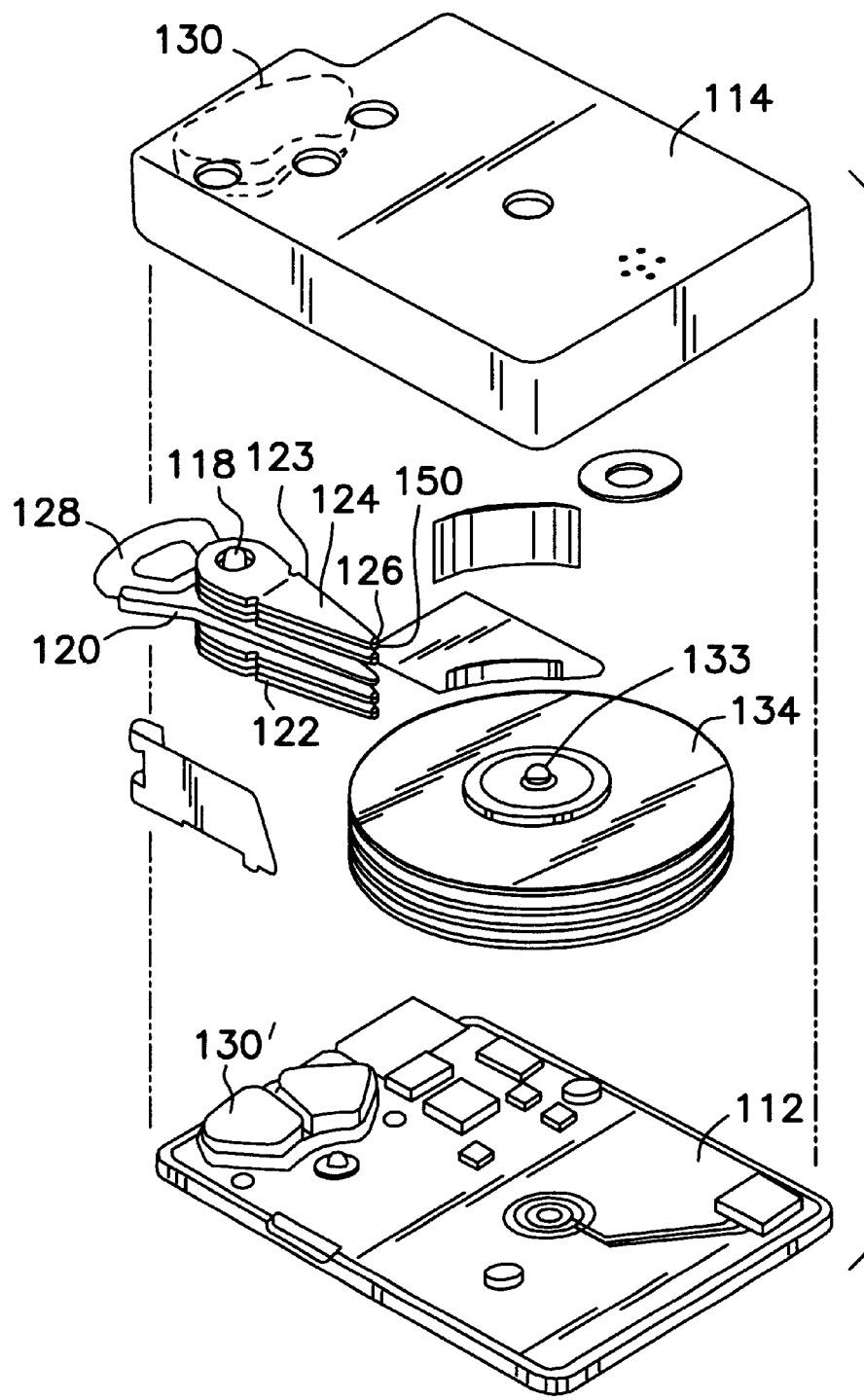
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing 112, and a housing cover 114. The housing or base 112 and housing cover 114 form a disk enclosure. Rotatably attached to the housing 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached to the housing 112 is one of a pair of magnets 130 and 130'. The other of the pair of magnets 130' is attached to the housing cover 114. The pair of magnets 130 and 130', and the voice coil 128 are key parts of a voice coil motor which applies a force to the actuator assembly 120 to rotate it about the actuator shaft 118. Also mounted to the housing 112 are a spindle motor and spindle hub 133. The spindle motor is an "in hub" motor which means the motor fits within the spindle hub 133. The spindle motor rotates the spindle hub. In FIG. 1, a number of disks 134 are attached to the spindle hub 133. In other disk drives a single disk or a different number of disks may be attached to the hub. The invention described herein is equally applicable to other such disk drives.

Figure 2:
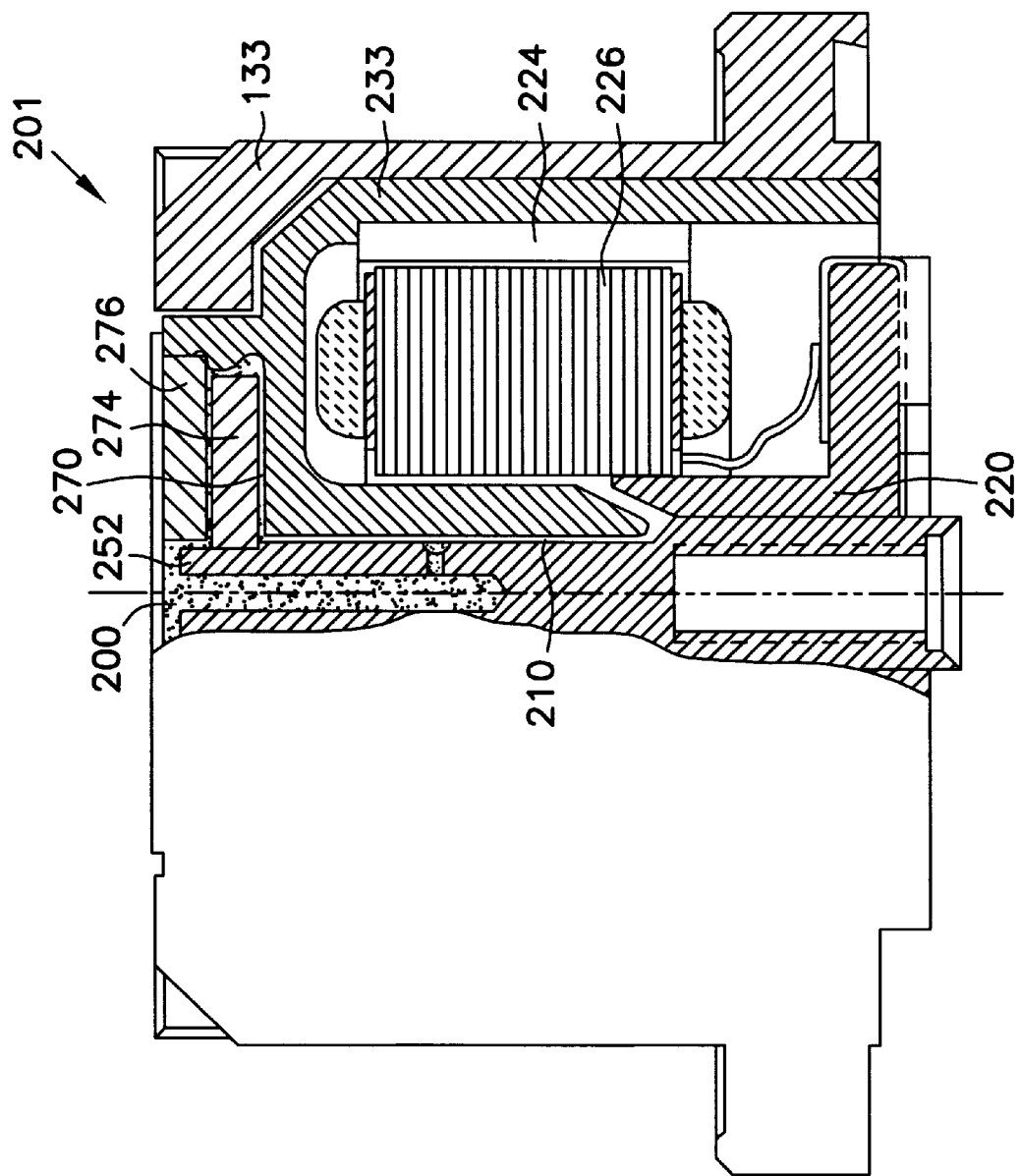
FIG. 2 is a partially broken away vertical section view of a motor incorporating the present invention.

FIG. 2 is a partially broken away vertical section view of a motor incorporating the present invention. In FIG. 2, the disks 134 have been removed from the spindle hub 133 for the sake of illustration. The spindle assembly 201 includes the spindle hub 133 and is attached to an internal rotating member 233. The internal rotating member 233 has a surface 235 which is positioned in close proximity to the outside surface of a fixed or stationary shaft 252. Within the fixed or stationary shaft 252 is a reservoir 200. A lubricant 210 is stored within the reservoir 200. The internal rotating member 233 of spindle hub 133 rotates about the fixed or stationary shaft 252 on a hydrodynamic bearing. The basic principle of a hydrodynamic bearing is well known in the art. Either the surface of the fixed shaft or the surface of the internal rotating member 233 is provided with cylindrical sections of spiral grooves. A thrust plate 274 can also be provided with concentric spiral groove sections. The thrust plate 274 is attached to the fixed shaft 252. A counterplate 276 is attached to the internal rotating member 233 of the hub 133. Lubricating fluid 210 from the reservoir 200 is positioned between the rotating member 233 and the fixed shaft 252 and between the rotating member 233 and the thrust bearing 274. The rotation of the internal rotating member 233 of spindle hub 133 churns and pumps the fluid as a function of the direction, width and angle of the grooves with respect to the sense of rotation. The pumping action builds up multiple pressure zones along the surface of the internal rotating member 233 of spindle hub 133 adjacent the stationary shaft 252 and adjacent the thrust plate 274. The fixed shaft 252 includes a bore 234 in the shaft 252 to the reservoir 200. The pumping action circulates the lubricating fluid 210 located between the internal rotating member 233 of spindle hub 133 and the stationary shaft 252, and located between the internal rotating member 233 and the thrust plate 274 with the lubricating fluid 200 in the reservoir 200. Lubricating fluid 210 comes out of the top of a reservoir 200 and moves between the counterplate 276 and fixed shaft 252 into the thrust bearing gap 270. A seal 280 fits over the counterplate 276, a portion of the internal rotating member 233 and the reservoir 200. The seal 280 keeps the lubricating fluid 210 within the reservoir 200 and at the interface between the bearing surfaces.

In this design, the counterplate 276, the internal rotating member 233, and the hub 133 rotate. The shaft 252 and the thrust plate 274 are stationary. The hydrodynamic bearing formed provides for smooth rotational operation. A magnet 224 is supported on the interior surface of the internal rotating member 233 of spindle hub 133. A stator 226 is attached to a fixed portion 220 of the housing 112 which captures one end of the fixed shaft 252. The stator 226 and the magnet 224 form an electric motor. In operating mode, the stator 226 is energized to cause the rotation of the hub 133 by the interaction between the stator 226 and the magnet 224.

In this design the stator 226 or windings of the electrical motor are positioned near the interface between the internal rotating member 233 and the fixed shaft 252. In other words, the stator 226 is positioned near the fluid bearing surface located at the interface between the internal rotating member 233 and the fixed shaft 252. Before the stator 226 is energized to cause rotation of the hub 133, a current is passed through the stator that will cause the windings associated with the stator 226 to heat the lubricating fluid 210 associated with the hydrodynamic bearing. The current is high enough to cause heat but low enough to prevent rotation of the hub 133 with respect to the fixed shaft 252. The current needs to be sufficient to heat the lubricant, but not so high as to damage the windings. The current needs to be sufficient to heat the lubricant, but not so high as to allow the spindle to begin rotating at rates lower than the desired starting profile in order to have correct head sliding and lift-off characteristics. The current also needs to be sufficient to heat the lubricant, but not so high as to impart an excessive torque on the head gimbals while the discs are not macro moving but have micro moved against the head stiction.

The current can be direct current (i.e., dc) or the current can be an alternating current (i.e., ac). For example, an alternating current of high frequency sets up many eddy currents in the windings of the stator 226 and causes heat which is transferred to the lubricating fluid 210. As a result of heating the lubricating fluid 210, the viscosity of the lubricating fluid 210 goes down which lessens the starting torque required of the electrical motor to start the rotation of the hub 133 with respect to the fixed shaft 252. Generally, a motor which has a lower start torque is more efficient when running at the operating temperature. In addition, since the start torque is lower, the motor within the hub 133 can be smaller.

Figure 3:
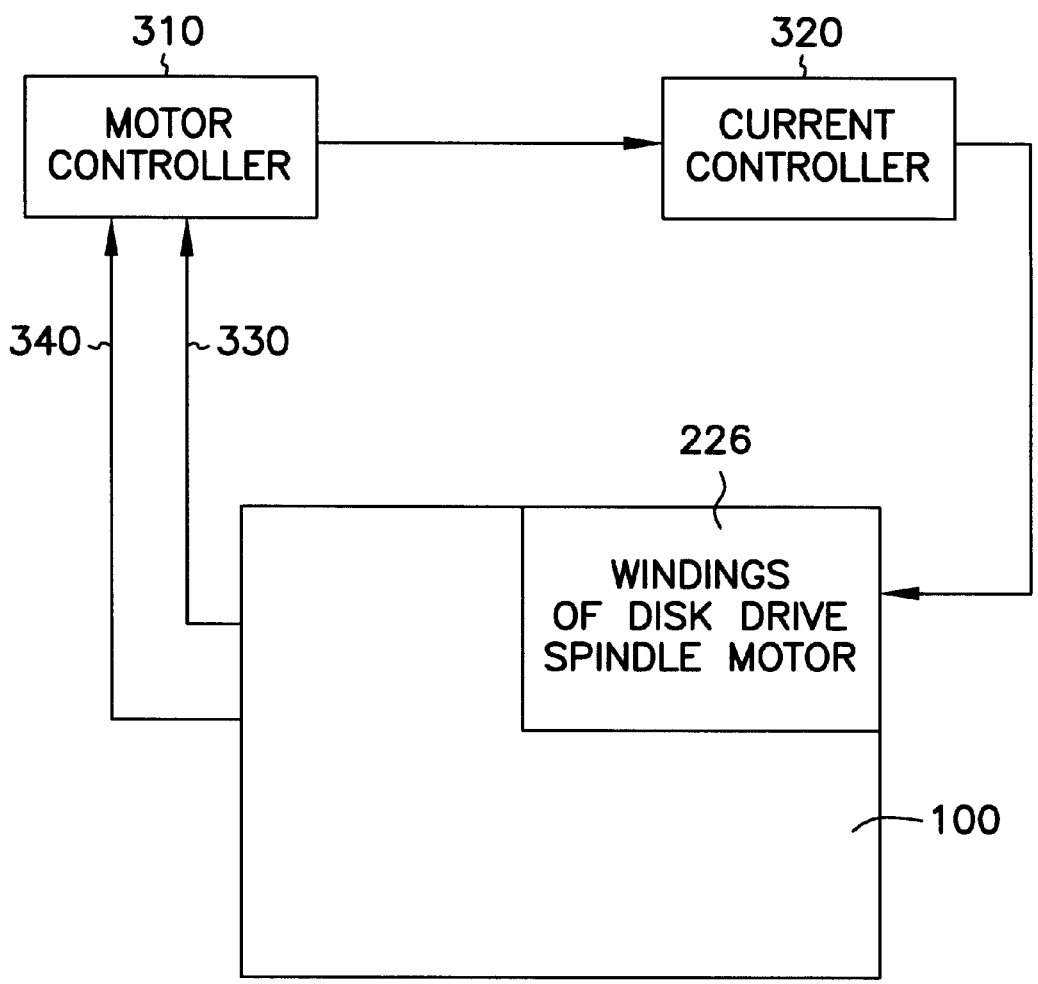
FIG. 3 is a schematic view of a motor controller and a current controller.

FIG. 3 shows a motor controller 310 which in turn controls a current controller 320. The output of the current controller 320 controls the amount of current and timing of the current passed into the various coils associated with the stator 226. The motor controller 310 receives feedback on the rotational speed of the hub and disk pack, depicted as line 330, from the servo system associated with the disk drive 100. The motor controller 310 also controls the current controller 320 at startup. The type of current passed into the windings of the stator 226 and the timing of the current is controlled by the motor controller 310 and current controller 320. The current applied before startup is at a level lower than the level needed to rotate the hub 133 with respect to the housing 112. In the case of a design where the hub 133 rotates with respect to a fixed shaft 252, the current applied before startup is at a level lower than the level needed to rotate the hub 133 with respect to the fixed shaft 252. The level and type of the current must be selected so that sufficient heat will be generated to heat the lubricating fluid 210. The current needs to be sufficient to heat the lubricant, but not so high as to damage the windings. The current needs to be sufficient to heat the lubricant, but not so high as to allow the spindle to begin rotating at rates lower than the desired starting profile in order to have correct head sliding and lift-off characteristics. The current also needs to be sufficient to heat the lubricant, but not so high as to impart an excessive torque on the head gimbals while the discs are not macro moving but have micro moved against the head stiction. For lack of a better term, the level and type of current that is at a level lower than the level needed to rotate the hub 133 with respect to the fixed shaft 252 will be termed the heating current. In addition, the heating current must be applied for a sufficient time so that the viscosity of the lubricant drops to a point where the startup torque is lessened to a desired value.

There are two options for determining the amount of time to apply the heating current to the windings of the stator 226. One option is to merely apply the heating current for a selected amount of time. This is an open loop option since there is no feedback control. An open loop design is based upon engineering calculations of the properties and values required in the worst case condition of temperature, viscosity, and winding properties along with the applicable parameters and tolerances of the motor components as well as head stiction parameters. The other option, which is shown in FIG. 3, is to determine the viscosity of the lubricating fluid 210 and produce a feedback signal to the motor controller 310 when the feedback signal indicates a desired viscosity. A feedback signal, depicted by line 340 in FIG. 3, which indicates the viscosity of the lubricating fluid 210, is passed to the motor controller 310. When the lubricating fluid 210 reaches a selected viscosity level, the motor controller 310 sends a command to the current controller 320 that halts the heating current and allows current to be applied to the windings that will result in the rotation of the stator 226 with respect to the housing 112. When acceptable viscosity values have been achieved, the current controller 310 needs to increase the current to a value that produces the desired starting profile. There are several ways to design a feedback control system, such as shown in FIG. 3. The design can be programmable based upon temperature sensing feedback along with predetermined values. The design can have additional feedback control based upon temperature, sensing of winding current and voltage. The design could also be adaptive based upon measurement of the foregoing parameters along with the addition of measurements of the start profile and run currents.

Figure 4:
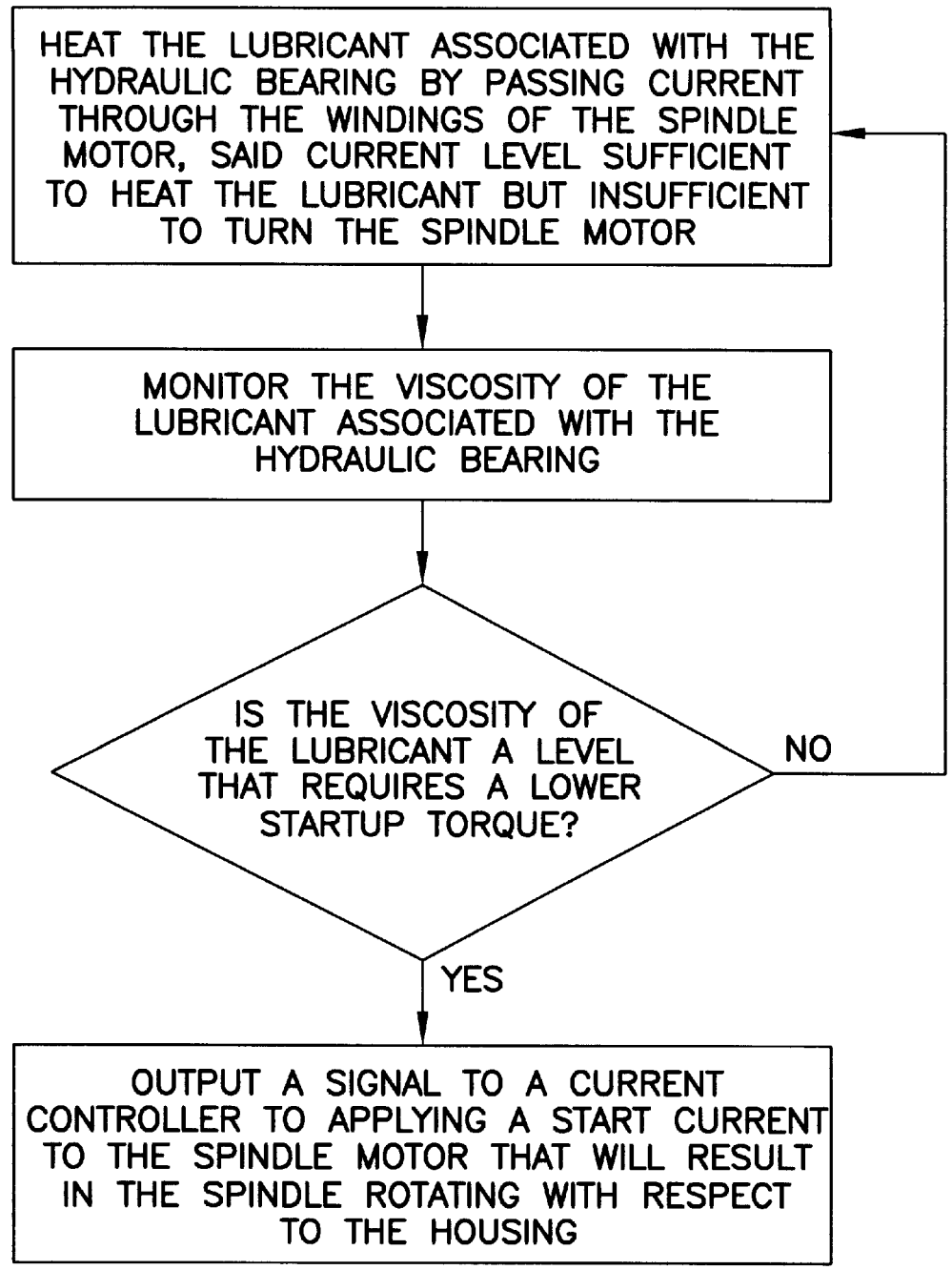
FIG. 4 is a flow diagram of the method for applying a heating current to a stator.

FIG. 4 is a flowchart which shows the method of applying a heating current to the stator 226 before applying current to the stator that rotates the hub 133 with respect to the housing 112. The first step, depicted by reference numeral 410, is to heat the lubricant associated with the hydraulic bearing by passing current through the windings of the spindle motor. The current level must be sufficient to heat the lubricant but insufficient to turn the spindle motor. Either dc or ac current can be used as a heating current for heating the lubricant or lubricating fluid 210 of the hydrodynamic bearing. The next step, depicted by reference numeral 420, is to monitor the viscosity of the lubricant associated with the hydraulic bearing. A decision box, depicted by reference numeral 430, determines if the viscosity of the lubricant is at a desired level. The desired level is at least at a level that requires a lower startup torque than without heating of the lubricant or lubricating fluid 210. If the viscosity of the lubricant is at the desired level, the next step, depicted by reference numeral 440, is to output a signal to a current controller for applying a start current to the spindle motor that will result in the spindle rotating with respect to the housing. If the viscosity of the lubricant is not at the desired level, heating of the lubricant is continued. Monitoring the viscosity of the lubricant is also continued.

It should be noted that this method is applicable to any type of hydrodynamic or fluid bearing. The hydrodynamic bearing having a fixed shaft, shown in this application, is not the only type of hydrodynamic bearing to which this invention can be applied. For example, U.S. Pat. No. 5,487,608 issued to Leuthold et al. describes a disk drive having a hub 133 with a shaft that rotates within a sleeve associated with the housing of the disk drive. Other hydrodynamic bearings, such as conical bearings, can also have a heating current applied to the lubricating fluid so as to lessen the startup torque.

Figure 5:
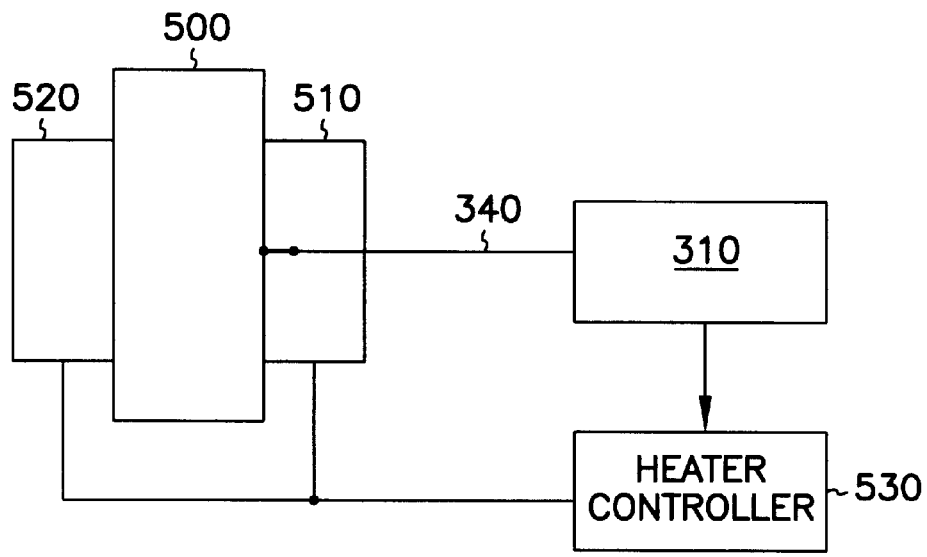
FIG. 5 is a schematic view of a hydrodynamic bearing.

In some instances, the motor start/run windings are not suitable for use as a preheater of the lubricating fluid 210. In these cases a separate heater element can be added to the motor assembly to allow heating of the lubricating fluid 210 without any possibility of torque being imparted on the disk pack. In this case, the design would be such that the heating element achieves the application of heat without imparting excessive distortion to the hydrodynamic bearing. FIG. 5 shows a schematic view of a hydrodynamic bearing 500. Positioned near the hydrodynamic bearing 500 is a first heating element 510 and a second heating element 520. The heating elements 510 and 520 are attached to a heater controller 530 which is in turn controlled by the motor controller 310. The motor controller 310 can control the heat applied by the heating elements 510 and 520 by either of two methods. The first method can be open loop control where the heater controller 530 controls the first heating element 510 and the second heating element 520 so that heat is applied to the hydrodynamic bearing 500 for a selected amount of time. The second method is to use a closed loop control method in which the viscosity of the lubricating fluid 210 is monitored and a control signal is sent to the motor controller 310. The feedback control signal passes along line 340 in FIG. 5. As mentioned above, there are several ways to design a feedback control system. The design can be programmable based upon temperature sensing feedback along with predetermined values. The design could also be adaptive based on the measurement of several parameters along with the addition of additional measurements associated with the start profile and run currents of an electric motor.

One possible implementation of a separate heater or separate heating elements 510 and 520 would be to form a fixed shaft 252 (as shown in FIG. 2) that has heating elements 510 and 520 embedded therein. The heating elements 510 and 520 would be placed within the fixed shaft 252 so that the heating element would be positioned between the reservoir 200 of lubricating fluid 210 and the bearing surfaces of the hydrodynamic bearing. Other possible placements for heating elements might be as a separate heater winding wound with the start/run windings associated with the stator 226.

Advantageously, a disk drive that includes a system for preheating the lubricating fluid 210 of the hydrodynamic bearing allows for use of spindle motors which have lower start torque requirements. As a result, the spindle motors can spin up quicker and are easier to keep on a start torque profile. In addition, these motors are typically more efficient in the run mode when the disk pack is spinning during read and write operations.

Figure 6:
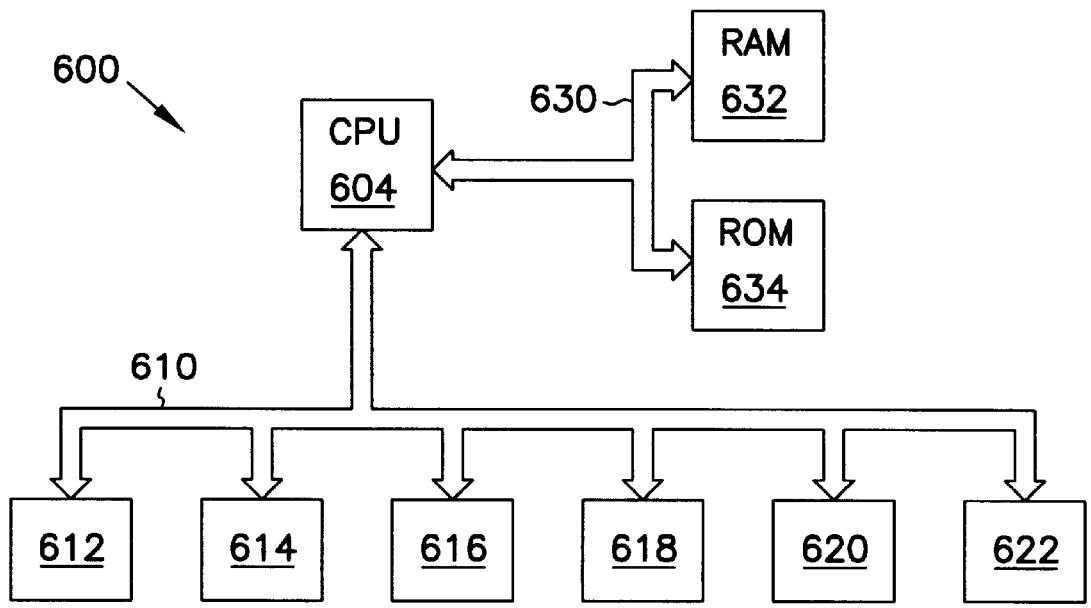
FIG. 6 is a schematic view of an information handling system.

FIG. 6 is a schematic view of a computer system. Advantageously, the invention is well suited for use in a computer system 600. The computer system 600 may also be called an electronic system or an information handling system and includes a central processing unit, a memory and a system bus. The information handling system includes a central processing unit 604, a random access memory 632, and a memory bus 630 for communicatively coupling the central processing unit 604 and the random access memory 632. The information handling system 600 includes a disk drive device which includes the viscosity compensation device described above. The information handling system 600 may also include an input/output bus 610 and several peripheral devices, such as 612, 614, 616, 618, 620, and 622 may be attached to the input output bus 610. Peripheral devices may include hard disk drives, magneto-optical drives, floppy disk drives, monitors, keyboards and other such peripherals. Any type of disk drive may be adapted with a hydrodynamic bearing and this invention could be employed therein.

As mentioned previously, the magnetic disk drive 100 includes a housing 112. A hub 133 is rotatably attached to the housing 133 with a hydraulic bearing, said hydraulic bearing using a lubricant or lubricating fluid 210. The spindle motor (226 and 224) is for rotating the hub 133 with respect to said housing 112. The spindle motor (226 and 224) includes motor windings 226. A source of current 320 for passing current through said motor windings 226 at a level lower than the level needed to rotate the hub 133 with respect to the housing 112. The source of current 320 is maintained at the level lower than the level needed to rotate the hub until the viscosity of the lubricant 210 is lowered. The source of current is maintained at the level lower than the level needed to rotate the hub until the viscosity of the lubricant is lowered to a level where the start up torque of the spindle motor (226 and 224) is lowered. The source of current 320 may be maintained at the level lower than the level needed to rotate the hub for a selected amount of time. A disk 134 is attached to said hub 133. In one embodiment, a shaft 252 is attached to the housing 112. The source of current 320 is maintained at the level lower than the level needed to rotate the hub 133 with respect to said shaft 252. In another embodiment, the shaft is attached to said hub 133 and the housing 112 includes an opening for receiving said shaft. The source of current 320 is maintained at the level lower than the level needed to rotate the hub 133 and shaft with respect to said housing.

An information handling system 600 comprises a base 112 and a spindle assembly 201 rotatably attached to said base 112. The spindle assembly 201 further comprises a hub 133 and a hydraulic or hydrodynamic bearing including a lubricant 210 for rotatably attaching the hub 133 to said base 112. A motor (226 and 224) having windings 226, rotates the hub 133 with respect to said base 112. Also included is means for reducing the viscosity of the lubricant. The means for reducing the viscosity of the lubricant includes a source of current 320 and a current controller 310 for maintaining the current level at a level below which will cause the hub 133 to rotate with respect to said base 112. Alternatively, the means for reducing the viscosity of the lubricant includes a source of heat 510, 520.

A method for starting a disk drive 100 having a spindle motor (226 and 224) and having a hydraulic bearing, comprises the steps of heating the lubricant 210 associated with the hydraulic bearing, and applying a start current to the spindle motor after heating the lubricant. The step of heating the lubricant associated with the hydraulic bearing may include the step of passing current through the windings of the spindle motor (226 and 224) at a level sufficient to heat the lubricant 210 but insufficient to turn the spindle motor (226 and 224). The step of heating the lubricant 210 associated with the hydraulic bearing further comprises the step of passing current through the windings 226 of the spindle motor (224 and 226) at a current level sufficient to heat the lubricant 210 but low enough to keep the torque on the transducers 150 at a level where the transducers 150 will remain on the actuator arm 123 of the disk drive 100. The step of heating the lubricant 210 associated with the hydraulic bearing further comprises the step of passing current through the windings 226 of the spindle motor (226 and 224) for a selected length of time. The startup method may also include the step of monitoring the viscosity of the hydraulic bearing. The method may also include the steps of outputting a signal to a current controller 310 when the viscosity is at a level that requires a lower startup torque and applying a current level to the spindle motor that will start the rotation of the spindle motor at the lower startup torque.

The spindle assembly 201 for the magnetic disk drive 100 includes the shaft 252, the hub 133, and a hydrodyamic or hydraulic bearing. The hydraulic bearing includes the lubricating fluid or lubricant 210. The hydraulic bearing allows for rotatable attachment of the hub to the shaft. Also included is means for reducing the viscosity of the lubricant 210. The means for reducing the viscosity of the lubricant further comprises means for applying heat to the hydraulic bearing. The spindle assembly 201 further includes the spindle motor (226 and 224) for rotating the hub 133. The spindle motor includes motor windings 226. The means for reducing the viscosity of the lubricant includes means for passing current through the windings at a level below where the hub 133 will rotate.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A magnetic disk drive comprising:
   a housing;
   a hub rotatably attached to said housing with a hydraulic bearing, said hydraulic bearing using a lubricant;
   a spindle motor for rotating the hub with respect to said housing, said spindle motor including motor windings; and
   a source of current for passing current through said motor windings at a level lower than the level needed to rotate the hub with respect to the housing until the startup torque needed to start the spindle motor is lowered.

2. A magnetic disk drive comprising:
   a housing;
   a hub rotatably attached to said housing with a hydraulic bearing, said hydraulic bearing using a lubricant;
   a spindle motor for rotating the hub with respect to said housing, said spindle motor including motor windings; and
   a source of current for passing current through said motor windings at a level lower than the level needed to rotate the hub with respect to the housing, wherein the source of current is maintained at the level lower than the level needed to rotate the hub until the viscosity of the lubricant is lowered.

3. The magnetic disk drive of claim 2 wherein the source of current is maintained at the level lower than the level needed to rotate the hub for a selected amount of time.

4. The magnetic disk drive of claim 2 further comprising a disk attached to said hub.

5. The magnetic disk drive of claim 4 further comprising a shaft attached to said housing, wherein the source of current is maintained at the level lower than the level needed to rotate the hub with respect to said shaft.

6. The magnetic disk drive of claim 4 further comprising:
   a shaft attached to said hub; and
   a housing including an opening for receiving said shaft, wherein the source of current is maintained at the level lower than the level needed to rotate the hub and shaft with respect to said housing.

7. A magnetic disk drive comprising:
   a housing;
   a hub rotatably attached to said housing with a hydraulic bearing, said hydraulic bearing using a lubricant;
   a spindle motor for rotating the hub with respect to said housing, said spindle motor including motor windings; and
   a source of current for passing current through said motor windings at a level lower than the level needed to rotate the hub with respect to the housing, wherein the source of current is maintained at the level lower than the level needed to rotate the hub until the viscosity of the lubricant is lowered to a level where the start up torque is lowered.

8. An information handling system comprising:
   a base; and
   a spindle assembly rotatably attached to said base, said spindle assembly further comprising:
   a hub;
   a hydraulic bearing including a lubricant, said hydraulic bearing for rotatably attaching the hub to said base;
   a motor having windings, for rotating the hub with respect to said base; and
   means for reducing the viscosity of the lubricant, wherein the means for reducing the viscosity of the lubricant includes:
   a source of current; and
   a current controller for maintaining the current level in at least one winding of the motor at a level below which will cause the hub to rotate with respect to said base.

9. A method for starting a disk drive having a spindle motor with windings, and having a hydraulic bearing, said method comprising steps of:

heating the lubricant associated with the hydraulic bearing by passing current through the windings, the current less than that necessary to apply a rotational force to the spindle motor; and applying a start current to the spindle motor after heating the lubricant.

10. A method for starting a disk drive having a spindle motor and having a hydraulic bearing, said method comprising steps of:

heating the lubricant associated with the hydraulic bearing; and applying a start current to the spindle motor after heating the lubricant, wherein the step of heating the lubricant associated with the hydraulic bearing further comprises the step of passing current through the windings of the spindle motor, said current level sufficient to heat the lubricant but insufficient to turn the spindle motor.

11. A method for starting a disk drive having a spindle motor and having a hydraulic bearing, said method comprising steps of:

heating the lubricant associated with the hydraulic bearing; and applying a start current to the spindle motor after heating the lubricant, wherein the heating step further comprises a step of passing current through the windings of the spindle motor, said current level sufficient to heat the lubricant, said current level producing a torque on the transducers less than a level which would detach the transducers from the actuator arm of the disk drive.

12. A method for starting a disk drive having a spindle motor and having a hydraulic bearing, said method comprising steps of:

heating the lubricant associated with the hydraulic bearing; and applying a start current to the spindle motor after heating the lubricant, wherein the heating step further comprises a step of passing current through the windings of the spindle motor for a selected length of time.

13. A method for starting a disk drive having a spindle motor and having a hydraulic bearing, said method comprising steps of:

(a) heating the lubricant associated with the hydraulic bearing; and (b) applying a start current to the spindle motor after heating the lubricant, wherein the heating step further comprises steps of:

(a) (I) passing current through windings of the spindle motor, said current level sufficient to heat the lubricant but insufficient to turn the spindle motor; and (a) (ii) monitoring viscosity of the hydraulic bearing.

14. The method of claim 13 further comprising the steps of (c) outputting a signal to a current controller when the viscosity is at a level that requires a lower startup torque; and (d) applying a current level to the spindle motor that will start rotation of the spindle motor at the lower startup torque.

* * * * *